United States Patent [19]
Schnabel

[11] 3,944,450
[45] Mar. 16, 1976

[54] METHOD OF PRODUCING TANTALUM DRY-ELECTROLYTIC CAPACITORS

[75] Inventor: Werner Schnabel, Nattheim, Germany

[73] Assignee: Siemens Aktiengesellschaft, Berlin & Munich, Germany

[22] Filed: Nov. 15, 1973

[21] Appl. No.: 415,998

[30] Foreign Application Priority Data
Nov. 21, 1972  Germany............................ 2257063

[52] U.S. Cl. .................... 156/3; 252/79.4; 427/80; 427/122
[51] Int. Cl.² ........................................ B05D 5/12
[58] Field of Search .......... 117/215, 216, 226, 230, 117/62, 8; 427/80, 122; 252/79.2, 79.4; 156/3

[56] References Cited
UNITED STATES PATENTS
3,301,704  1/1967  Zind.................................... 117/230
3,345,208  10/1967  Keller et al. ........................ 117/230

Primary Examiner—Cameron K. Weiffenbach
Attorney, Agent, or Firm—Hill, Gross, Simpson, Van Santen, Steadman, Chiara & Simpson

[57] ABSTRACT

A method of producing a tantalum dry-electrolytic capacitor which comprises a sintered tantalum anode having applied thereto, by a forming process, an dielectric oxide layer and a semiconducting manganese dioxide cathode layer, with the latter being coated with a graphite layer serving as current supply, in which, after formation of the manganese dioxide layer, a thin layer of manganese dioxide is removed from the surface thereof by chemical treatment, following which the cathode is coated with the desired graphite layer.

8 Claims, 2 Drawing Figures

METHOD OF PRODUCING TANTALUM DRY-ELECTROLYTIC CAPACITORS

BACKGROUND OF THE INVENTION

The invention is directed to a process for the production of a tantalum solid or dry-electrolytic capacitor comprising a sintered tantalum anode to which an oxide layer, functioning as dielectric, is applied by a forming process, and which is provided with a semiconducting manganese dioxide layer, functioning as cathode, which, in turn, is coated with a graphite layer functioning as current supply.

The quality of electrolytic capacitors is not determined solely by the properties of the dielectric, but to a high degree also by the efficiency of the cathode supply line. In a tantalum dry-electrolytic capacitor, semiconducting manganese dioxide is employed as the cathode. In the production of such cathode, the formed sintered anoded is temporarily submerged in an aqueous manganese-nitrate solution with the manganese nitrate subsequently being pyrolytically transformed into manganese dioxide. The coating process is repeated several times to achieve a highly adhesive and electrically satisfactory layer of manganese dioxide. In addition, after several pyrolysis operations, an intermediate forming process is interposed. Finally, a thin graphite layer is produced on the finished manganese dioxide layer by submerging the structure in a solution with colloidal graphite. Such thin graphite layer functions as current supply to the cathode and, if desired or required, can be suitably contacted, for example with a conductive silver lacquer layer.

The present invention is based upon the recognition that the series resistance in a tantalum dry-electrolytic capacitor, and thus also the loss factor and apparent impedance, is not determined solely by the sum of the bulk resistances of the individual layers, but that the conditions at the boundary area between the manganese dioxide and graphite layers also exert a considerable influence.

BRIEF SUMMARY OF THE INVENTION

It is the object of the present invention to provide a method for the production of tantalum dry-electrolytic capacitors by means of which a considerable improvement may be achieved in the apparent impedance value and the loss factor.

This objective is realized in the present invention in the production of a tantalum dry-electrolytic capacitor of the type described by effecting, prior to the coating of the cathode with graphite, the chemical removal of a thin layer from the manganese dioxide surface.

There is thereby achieved the advantage of a reduction in the absolute values of apparent impedance and loss factor of tantalum dry-electrolytic capacitors, and further an improvement in the temperature dependence of such values.

DETAILED DESCRIPTION OF THE INVENTION

In an exemplary embodiment, the formed tantalum-sintered anodes, provided with completed manganese dioxide layers, were, prior to graphite treatment, submerged for 30 to 60 seconds in a treatment bath, in which the bath comprised a 2.5% acetic acid having added thereto 40 ml of 30% hydrogen peroxide per litre. The anodes were thereafter rinse with diluted acetic acid having a pH value of less than 4, for example containing 2.5% acetic acid, to remove any $M_n^{++}$ ions still present, following which they were further processed in a conventional manner to form finished capacitors (400 $\mu$F - 6V).

Figure 1:
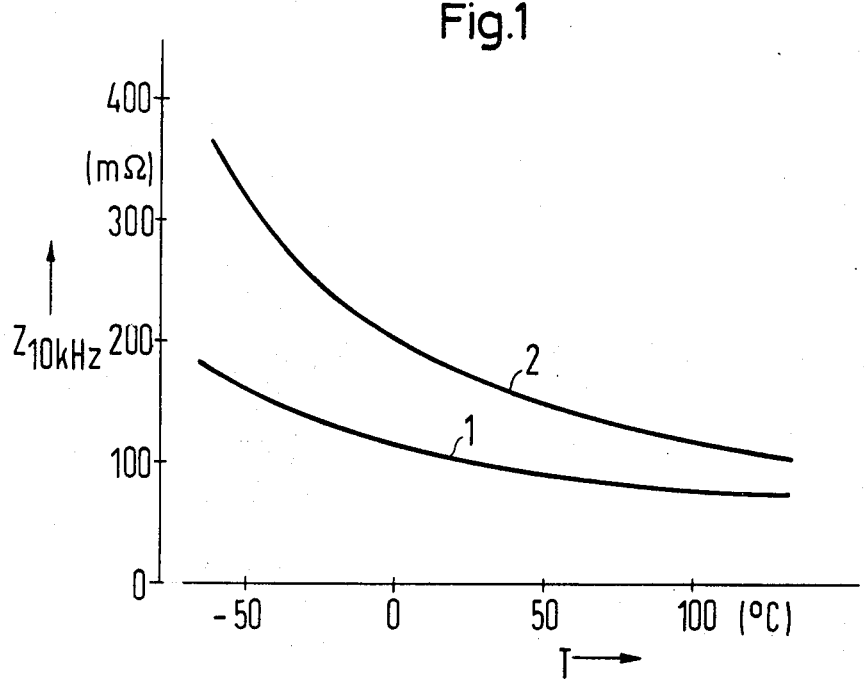
FIG. 1 is a chart depicting the dependence of the values of apparent impedance Z (measured at 10 kHz) as a function of temperature T.

The resulting tantalum dry-electrolytic capacitors were then tested as to the dependence of the apparent impedance Z as a function of temperature T, from which the chart of FIG. 1 was prepared, with the dependence of the values of the apparent impedance (measured at 10 kHz) as a function of the temperature. In the chart, curve 1 represents measurements on capacitors processed in accordance with the present invention, i.e., capacitors having a layer chemically removed prior to the graphite treatment, by means of a bath having a composition as above set forth. Curve 2 represents measurements on capacitors fabricated in the ordinary manner, i.e., having no pretreatment of the manganese dioxide layer prior to graphiting. As will be apparent from the figure, capacitors whose manganese dioxide surface was treated in accordance with the invention exhibit significantly lower apparent impedance values. It will also be noted from the figure that the impedance-temperature curve is considerably more uniform, i.e., exhibits less maximum to minimum differential, in the treated capacitors as compared with those that were untreated.

Figure 2:
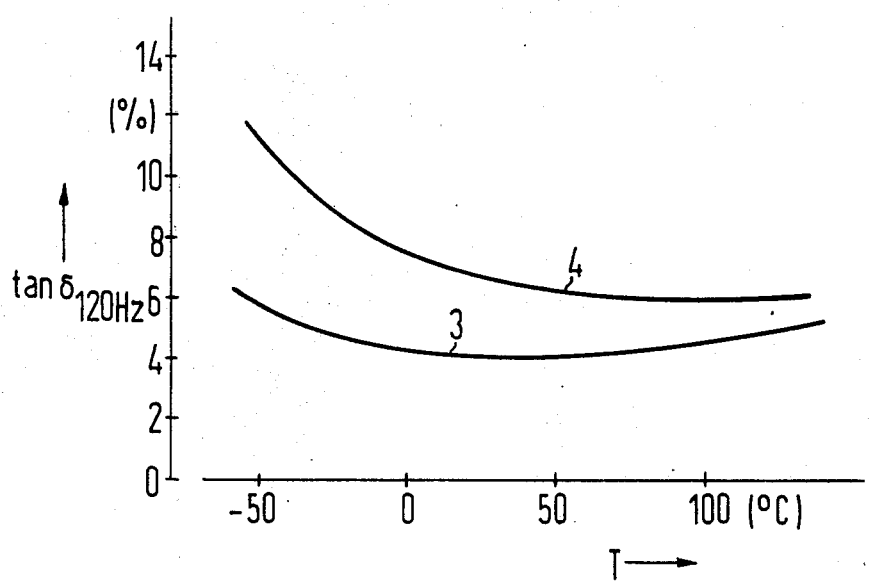
FIG. 2 is a chart depicting the loss factor tangent $\sigma$ (measured at 120 Hz) in dependence upon the temperature T.

Likewise, measurements on tantalum dry-electrolytic capacitors with respect to the loss factor tangent $\sigma$ (measured at 120 Hz) in dependence upon the temperature T, is illustrated in FIG. 2. Curve 3 represents measurements on capacitors which were produced in accordance with the invention, i.e., a thin layer was chemically removed from the surface of the manganese dioxide layer by utilization of a bath having a composition as previously set forth, while curve 4 depicts measurements on untreated capacitors. It will be apparent from the chart that the loss factor in capacitors which had their manganese dioxide layer subjected to the method of the invention, prior to the graphite treatment, is lower than in comparable untreated capacitors. Again, it will also be noted from the figure that the temperature dependence of the loss factor is also significantly lower and more uniform in the treated capacitors than in those that were untreated.

The noted improvement in the electrical values of tantalum dry-electrolytic capacitors manufactured in accordance with the present invention, results from an improved contacting between the manganese dioxide layer, serving as cathode, and the graphite layer serving as current supply. It is assumed that low-grade manganese dioxide is removed by the method of the invention and that the acid medium serves to produce a positive surface charge so that electrostatically favorable conditions are produced for a low ohmic contact between the manganese dioxide surface and the graphite surface, since the individual graphite particles possess a negative surface charge due to the employment of an ammoniacal stabilization of the graphite suspension utilized.

Having thus described my invention, it is obvious that although minor modifications might be suggested by those first in the art, it should be understood that I wish to embody within the scope of the patent warranted herein all such modifications as reasonably and profitably come within the scope of my contribution to the art.

I claim as my invention:

1. A method of producing a tantalum dry-electrolytic capacitor comprising a sintered tantalum anode, oxidized to form a dielectric layer, and a semiconducting manganese dioxide cathode layer which is coated with a graphite layer serving as current supply, characterized in that after the formation of the manganese dioxide layer a thin layer of manganese dioxide is removed from the surface thereof by chemical treatment in an acetic acid-hydrogen peroxide bath, following which the cathode is coated with said graphite layer.

2. A method according to claim 1, wherein the chemical treatment takes place for a period of 30 to 60 seconds.

3. A method according to claim 1, wherein the chemical treatment is followed by a rinsing operation in a dilute acetic acid solution with a pH value of less than 4.

4. A method according to claim 3, wherein the rinsing operation is effected in a bath containing 2.5% acetic acid.

5. A method according to claim 1, wherein the chemical treatment is effected in a 2.5% acetic acid bath, to which is added 40 ml of 30% hydrogen peroxide per liter.

6. A method according to claim 5, wherein the chemical treatment takes place for a period of 30 to 60 seconds.

7. A method according to claim 5, wherein the chemical treatment is followed by a rinsing operation in a dilute acetic acid solution with a pH value of less than 4.

8. A method according to claim 7, wherein the rinsing operation is effected in a bath containing 2.5% acetic acid.

* * * * *